United States Patent
Zhao et al.

(10) Patent No.: US 11,082,707 B2
(45) Date of Patent: Aug. 3, 2021

(54) ENCODING METHOD AND APPARATUS, IMAGE PROCESSING SYSTEM, AND COMPUTER-READABLE STORAGE MEDIUM

(71) Applicant: SZ DJI TECHNOLOGY CO., LTD., Shenzhen (CN)

(72) Inventors: Wenjun Zhao, Shenzhen (CN); Jianhua Zhang, Shenzhen (CN); Guopeng Zhang, Shenzhen (CN); Chengzhang Yang, Shenzhen (CN); Hui Sun, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/029,973

(22) Filed: Sep. 23, 2020

(65) Prior Publication Data

US 2021/0006802 A1      Jan. 7, 2021

Related U.S. Application Data

(63) Continuation of application No. PCT/CN2018/082026, filed on Apr. 4, 2018.

(51) Int. Cl.
*H04N 19/176* (2014.01)
*H04N 19/14* (2014.01)
*H04N 19/124* (2014.01)

(52) U.S. Cl.
CPC ......... *H04N 19/176* (2014.11); *H04N 19/124* (2014.11); *H04N 19/14* (2014.11)

(58) Field of Classification Search
CPC ..... H04N 19/176; H04N 19/14; H04N 19/124
See application file for complete search history.

(56) References Cited

U.S. PATENT DOCUMENTS

| | | | | |
|---|---|---|---|---|
| 5,537,215 A | * | 7/1996 | Niimura | H04N 9/8042 |
| | | | | 375/E7.148 |
| 2005/0105815 A1 | | 5/2005 | Zhang et al. | |
| 2016/0309149 A1 | * | 10/2016 | Thirumalai | H04N 19/129 |
| 2017/0208328 A1 | * | 7/2017 | Kuusela | H04N 19/59 |

FOREIGN PATENT DOCUMENTS

| | | |
|---|---|---|
| CN | 101977309 A | 2/2011 |
| CN | 102148978 A | 8/2011 |
| CN | 103533365 A | 1/2014 |
| CN | 104079933 A | 10/2014 |
| CN | 106658010 A | 5/2017 |

OTHER PUBLICATIONS

The World Intellectual Property Organization (WIPO) International Search Report for PCT/CN2018/082026 dated Dec. 29, 2018 6 Pages (including translation).

* cited by examiner

*Primary Examiner* — Obafemi O Sosanya
(74) *Attorney, Agent, or Firm* — Anova Law Group, PLLC

(57) ABSTRACT

An encoding method includes obtaining an image frame to be encoded. The image frame includes one or more image blocks. The method further includes determining one or more complexities of the one or more image blocks. Each of the one or more complexities corresponds to one of the one or more image blocks. The method also includes encoding the one or more image blocks based on the one or more complexities.

20 Claims, 5 Drawing Sheets

ENCODING METHOD AND APPARATUS, IMAGE PROCESSING SYSTEM, AND COMPUTER-READABLE STORAGE MEDIUM

CROSS-REFERENCE TO RELATED APPLICATION

This application is a continuation of International Application No. PCT/CN2018/082026, filed on Apr. 4, 2018, the entire content of which is incorporated herein by reference.

TECHNICAL FIELD

The present disclosure relates to the field of image encoding and decoding and, more specifically, to an encoding method and apparatus, an image processing system, and a computer-readable storage medium.

BACKGROUND

Image encoding technology can compress image data to facilitate the storage and transmission of image data. Image encoding technology is widely used in various fields, such as the fields of mobile terminal, unmanned aerial vehicle (UAV) image transmission, etc.

In order to obtain the optimal encoding effect, the encoding apparatus in conventional technology generally uses multi-pass encoding. That is, an image frame or one or more areas of an image frame are encoded multiple times to determine the optimal encoding parameters. However, this multi-pass encoding method requires multiple inputs and processing of image data, resulting in a large system overhead (e.g., overhead on the system bandwidth).

SUMMARY

In accordance with the disclosure, there is provided an encoding method including obtaining an image frame to be encoded. The image frame includes one or more image blocks. The method further includes determining one or more complexities of the one or more image blocks. Each of the one or more complexities corresponds to one of the one or more image blocks. The method also includes encoding the one or more image blocks based on the one or more complexities.

Also in accordance with the disclosure, there is provided an encoding an encoding apparatus including a processor and a memory storing program instructions. The program instructions, when executed by the processor, cause the processor to obtain an image frame to be encoded. The image frame includes one or more image blocks. The program instructions further cause the processor to determine one or more complexities of the one or more image blocks. Each of the one or more complexities corresponds to one of the one or more image blocks. The program instructions also cause the processor to encode the one or more image blocks based on the one or more complexities.

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

Unless otherwise defined, all the technical and scientific terms used in the present disclosure have the same or similar meanings as generally understood by one of ordinary skill in the art. As described in the present disclosure, the terms used in the specification of the present disclosure are intended to describe example embodiments, instead of limiting the present disclosure.

As used herein, the sequence numbers of processes do not represent the execution orders of the processes, which are determined by the function and inherent logic of the processes. The implementation process of the present disclosure is not limited thereto.

It should be understood that the various embodiments described in the present disclosure can be implemented individually or in combination, which is not limited in the embodiments of the present disclosure. Unless otherwise noted as having an obvious conflict, the embodiments or features included in various embodiments may be combined.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

It should be noted that the embodiments of the present disclosure do not specifically limit the format of the image frame that needs to be encoded, which can be RGB, YUV, or RAW.

The image encoding apparatus generally encodes in units of image blocks. An image block may also be referred to as a slice. A frame of image may include one or more slices, and each slice may include a plurality of components of the image. An example will be described in detail below to illustrate the relationship between a bitstream, an image frame, slices, and components with reference to FIGS. 1 and 2.

Figure 1:
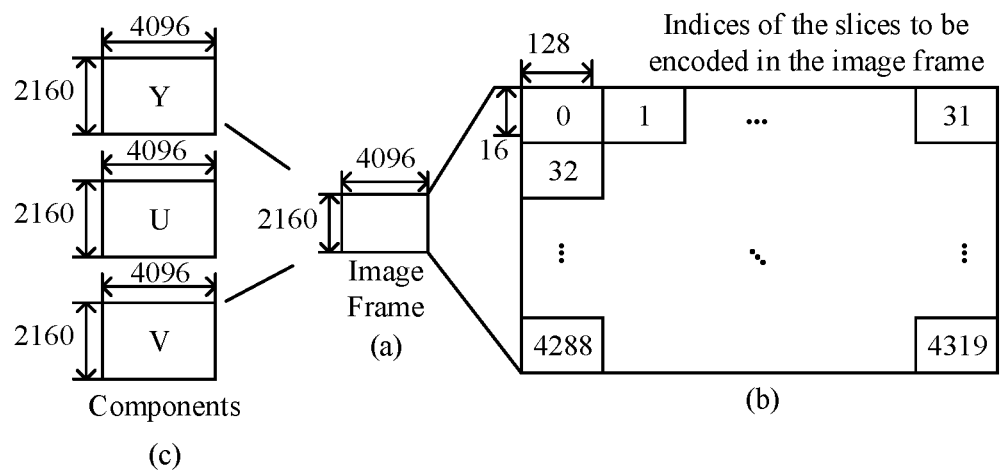
FIG. 1 is an example diagram illustrating a relationship between an image frame, a slice, a component, and a bitstream.

In one example, assume the specification of the image frame is 4K and the format of the image frame is YUV. As shown in part (a) of FIG. 1, the size of the 4K image frame is 4096×2160. As shown in part (b) of FIG. 1, the image frame is divided in units of 128×16, resulting in a total of 4320 slices, and each slice can be encoded and decoded independently. As shown in part (c) of FIG. 1, the pixels in an image frame generally include a plurality of components (such as the Y component, the U component, and the V component). After the image frame shown in part (a) of FIG. 1 is encoded, a bitstream may be obtained. The bitstream may include a frame header of the image frame, and the frame data corresponding to the frame header may include the bitstream information of 4320 sub-bitstreams. The sub-bitstream may include header files and the Y, U, and V components corresponding to the bitstream information.

Figure 2:
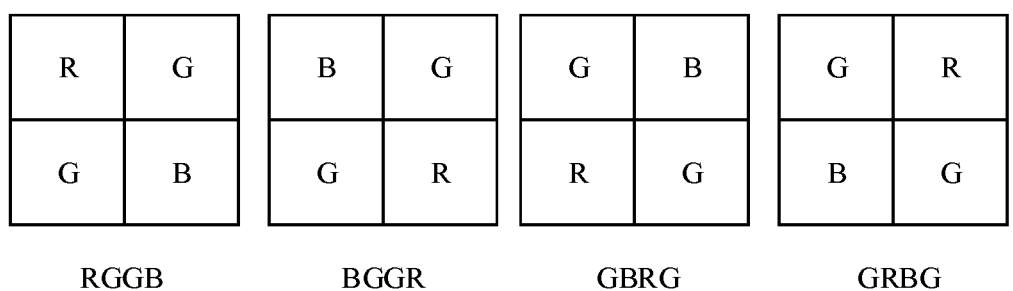
FIG. 2 is an arrangement pattern of four components of a RAW format image.
Figure 3:
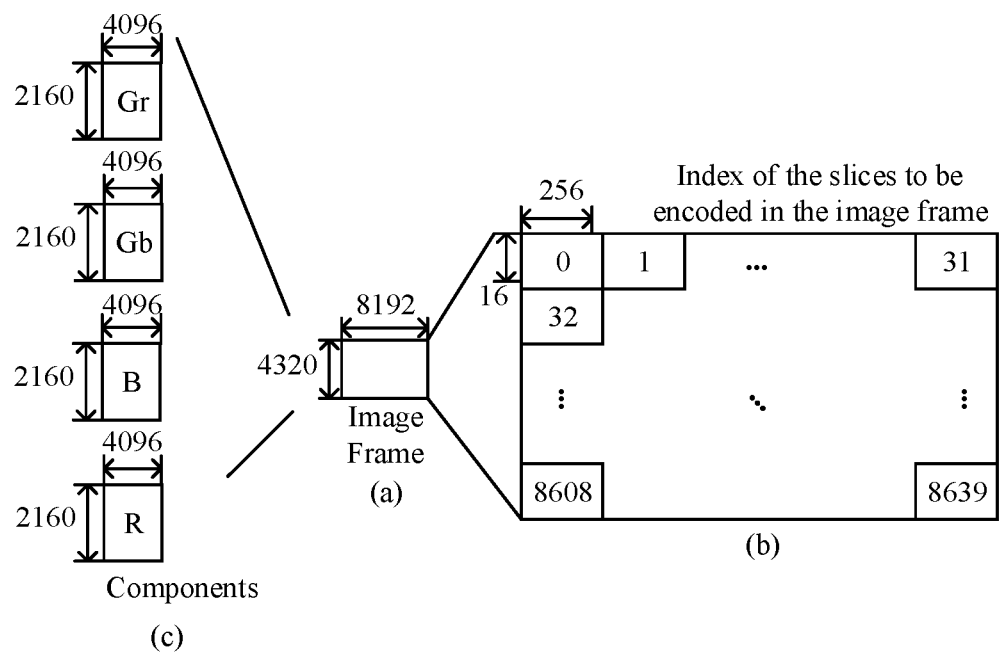
FIG. 3 is another example diagram illustrating the relationship between the image frame, slice, component, and bitstream.

In another example, assume the specification of the image frame is 8K and the format of the image frame is RAW. An image frame in RAW format generally includes four components, namely, Gr, Gb, B, and R. As shown in FIG. 2, the four components are arranged in four ways to form four Bayer patterns. As shown in part (a) of FIG. 3, the size of the 8K format image frame is 8192×4320. As shown in part (b) of FIG. 3, the image frame is divided in units of 256×16, resulting in a total of 8640 slices, and each slice can be encoded and decoded independently. As shown in part (c) of FIG. 3, the pixels in an image generally include a plurality of components (such as the G component, the B component, and the R component). After the image frame shown in part (a) of FIG. 3 is encoded, a bitstream may be obtained. The bitstream may include a frame header of the image frame, and the frame data corresponding to the frame header may include the bitstream information of 8640 sub-bitstreams. The sub-bitstream may include header files and the Gr, Gb, B, and R components corresponding to the bitstream information.

A slice can include a plurality of macroblocks, and a macroblock can include a plurality of pixels, such as 16×16 pixels. A macroblock can be further divided into a plurality of small codeblocks. Take a macroblock including 16×16 pixels as an example, the macroblock may include four codeblocks, and the size of each codeblock may be 8×8.

For the ease of understanding, the overall framework of an image processing system and the image encoding apparatus will be described first with reference to FIGS. 4 and 5.

Figure 4:
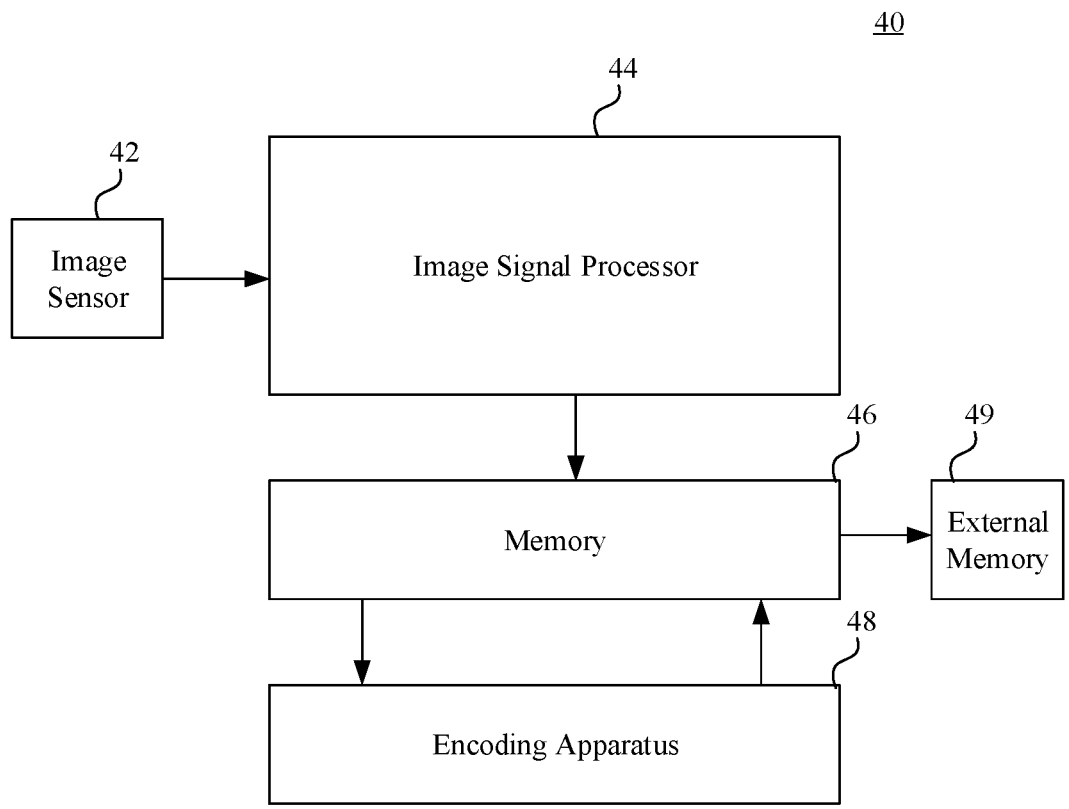
FIG. 4 is a schematic diagram of a general architecture of an image processing system.

FIG. 4 is an example of an overall framework of an image processing system. As shown in FIG. 4, an image processing system 40 includes an image sensor 42, an image signal processor (ISP) 44, a memory 46, and an encoding apparatus 48. In some embodiments, the image processing system 40 further includes an external memory 49.

The image sensor 42 can be used to collect image signals. The image sensor 42 may be, for example, an image sensor based on a complementary metal oxide semiconductor (CMOS) or an image sensor based on a charge coupled device (CCD).

The image signal processor 44 may be configured to process the image signals collected by the image sensor 42 to obtain image frames in a corresponding format.

The memory 46 may be, for example, a double data rate (DDR) memory. The memory 46 can store the image frames output by the image signal processor 44.

The encoding apparatus 48 may be configured to encode the image frames stored in the memory 46 to compress the data size of the image frames, thereby facilitating the storage and transmission of the image frames.

The external memory 49 may be, for example, a solid state disk (SSD), or another type of storage device.

Figure 5:
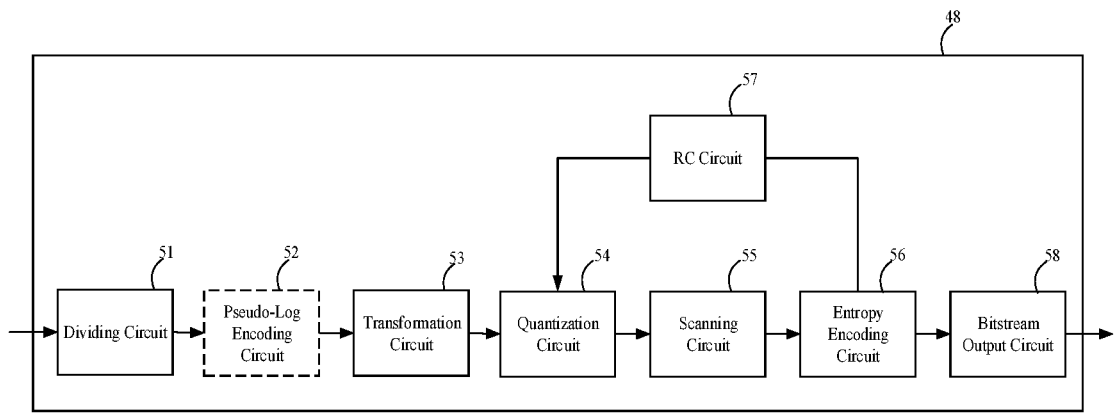
FIG. 5 is a schematic diagram of a general architecture of an encoding apparatus.

FIG. 5 is an exemplary diagram of an overall framework of the encoding apparatus 48. The encoding apparatus 48 may include one or a combination of a dividing circuit 51, a pseudo-log encoding (PLE) circuit 52, a transformation circuit 53, a quantization circuit 54, a scanning circuit 55, an entropy encoding circuit 56, a rate control (RC) circuit 57, a bitstream output circuit 58, etc.

The dividing circuit 51 can divide an image frame to be encoded into one or more image blocks that can be independently coded or decoded, and perform independent coding processing in units of image blocks.

The pseudo-log encoding circuit 52 can convert the data of the image block from linear data to non-linear data (or convert the image block from a linear domain to a non-linear domain). The subsequent operations such as transformation and quantization can be performed based on the data obtained after the pseudo-log encoding. It should be noted that the pseudo-log encoding circuit 52 may be an optional circuit in the encoding apparatus 48. In some embodiments, the transformation operations can be performed directly on the image block.

The transformation circuit 53 can be used to generate transform coefficients of the image block. The purpose of the transformation is to reduce the correlation (such as the spatial correlation) of the image data from the perspective of the frequency domain to reduce the bit rate. There may be a plurality of transformation methods corresponding to the transformation circuit 53, such as the Fourier transform or the discrete cosine transform (DCT).

The quantization circuit 54 can be used to quantize the transform coefficients output by the transformation circuit 53 to generate quantized coefficients. The quantization circuit 54 mainly takes advantage of the low sensitivity of the human eye to high-frequency signals, and discards part of the high-frequency information in the transformed data, thereby limiting the transform coefficients within a certain range and further reducing the bit rate.

The scanning circuit 55 can be used to convert the two-dimensional quantized coefficient output from the quantization circuit 54 into a one-dimensional quantized coefficient sequence. The scanning circuit 55 can include a plurality of scanning sequences, such as the zigzag sequence.

The entropy encoding circuit 56 may also be referred to as a variable length coder (VLC). Entropy coding may be, for example, Huffman coding or arithmetic coding. Entropy coding can express quantized coefficients in fewer bitstreams to achieve lossless compression of the quantized coefficients. In some embodiments, before entropy coding, a run length coding may also be performed on the quantized coefficients. Run length coding can express quantized coefficients with two run-level factors to further simplify the data. Run length coding and entropy coding may also be collectively referred to as entropy coding.

The RC circuit 57 generally calculates the quantization parameters used by the image block to be encoded by means of prediction or the like. The bitstream output circuit 58 can add header information to the head of the bitstream, thereby packaging the bitstream for output.

In order to reduce the system overhead, many encoding apparatuses adopt a single-pass encoding method, which means that the image is encoded at one time. However, the single-pass-based encoding method generally adjusts the encoding parameters of the current block based on the bit rate and the encoding result of the previous block. This bit rate-based encoding parameter control mechanism is not accurate enough, resulting in poor image encoding quality.

Figure 6:
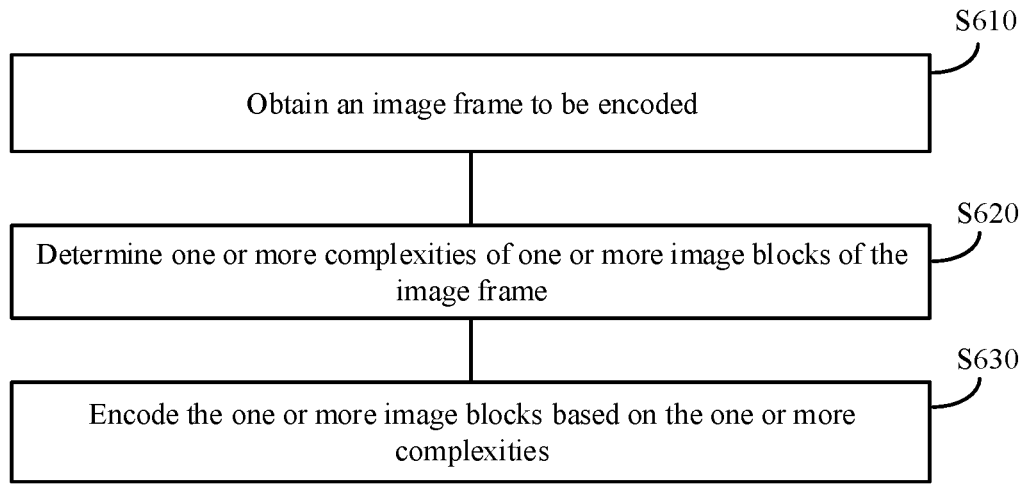
FIG. 6 is a flowchart of an encoding method according to an embodiment of the present disclosure.

In order to improve the coding quality of the image, an embodiment of the present disclosure provides an encoding method, which will be described in detail below with reference to FIG. 6.

The encoding method provided in the embodiments of the present disclosure may be executed by an encoding apparatus, and the encoding apparatus may be, for example, the encoding apparatus 48 described above. The encoding method will be described in detail below.

S610, obtaining an image frame to be encoded.

The image frame may include one or more image blocks. The image blocks may be slices, for example. The size of the image block can be determined based on actual needs. For example, the size of the image block may be 32 pixels by 8 pixels, 128 pixels by 8 pixels, etc., which is not limited in the embodiments of the present disclosure.

S620, determining one or more complexities of one or more image blocks. Each of the one or more complexities corresponds to one of the one or more image blocks.

There can be many methods to define or calculate the complexity of an image block. For example, the complexity of an image block can be defined or calculated based on the amplitude of the high-frequency components of the pixels in an image block area. For example, the complexity of an image block can be the cumulative sum of the amplitudes of the high-frequency components of all pixels in the image block area. When the texture of the image block area is more complex, the cumulative sum of the amplitudes of the corresponding high-frequency components may be correspondingly larger, and the complexity of the image block area can be considered to be higher. According to the image coding theory, the coded bitstream (or the number of bits needed for coding) corresponding to the image block area with higher complexity will be correspondingly higher. More specifically, the high-frequency components can be obtained through filtering operations based on the pixel values of the pixels in the image block area, and the complexity of the image block can be calculated. In this disclosure, the number of bits is also referred to as a "bit number," and correspondingly the number of bits for coding or the number of coding bits is also referred to as a "coding bit number."

In another example, the complexity of the image block can be defined or calculated based on the mean-square error (MSE) of the pixel value in the image block. If the MSE of the pixel value of an image block is larger, it can be considered that the complexity of the image block is higher.

Of course, the complexity of the image block can also be defined in other ways, or a combination of the above definitions, which is not limited in the embodiments of the present disclosure.

During the calculation of the complexity of the image block, since each image block may include a plurality of components, the complexity of the image block in each component can be determined first based on the pixel value of the image block in each component. Subsequently, the complexity of the image block may be determined based on the complexity of the image block in each component. Alternatively, the complexity of the image block may be directly determined based on the pixel values of all pixels of the image block. In this disclosure, the complexity of an image block in a component is also referred to as a "component complexity."

The complexity of the image block can be calculated by the image single processor 44 shown in FIG. 4, or can be calculated by the encoding apparatus 48 shown in FIG. 4. Take the use of the image signal processor 44 to calculate the complexity of each image block as an example, the image signal processor 44 may divide the image frame into image blocks before inputting the image frame into the memory 46, and calculate the complexity of each image block. Take the use of the encoding apparatus 48 to calculate the complexity of each image block as an example, after dividing the image frame into image blocks, the encoding apparatus 48 may first calculate the complexity of the image block, and then perform subsequent encoding processing on each image block based on the complexity of the image block.

S630, encoding the one or more image blocks based on the one or more complexities of the one or more image blocks.

S630 can be implemented in many ways. For example, the corresponding encoding parameters of the one or more image blocks may be calculated based on the one or more complexities of the one or more image blocks, and then the one or more image blocks may be encoded using the encoding parameters corresponding to the one or more image blocks. In another example, the initial encoding parameters corresponding to the one or more image blocks may be calculated based on the one or more complexities of the one or more image blocks, and then the encoding parameters of the un-encoded image blocks may be adjusted in real time based on the actual coding situation to complete the encoding of each image block. The implementation of S630 will be described in detail below in conjunction with specific embodiments.

Consistent with the present disclosure, the complexity of the image block in the image frame can be pre-calculated, and the encoding process of the image block as a whole can be guided based on the complexity of the image block. As such, the encoding accuracy can be improved, thereby improving the encoding quality of the image.

The implementation of S630 will be described in below with reference to specific embodiments.

Figure 7:
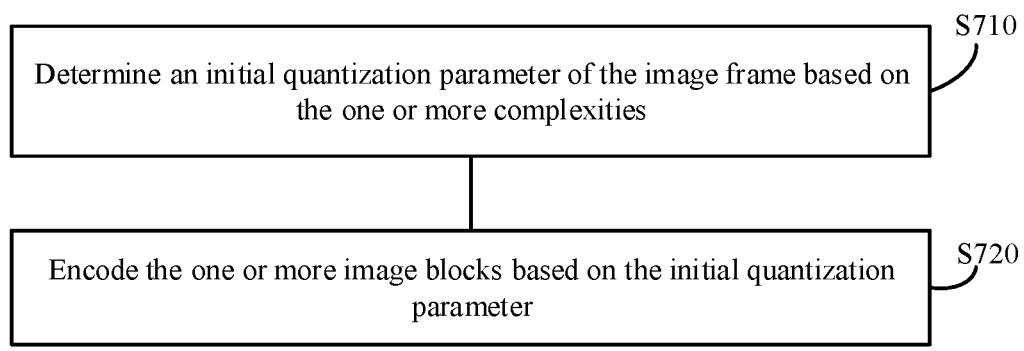
FIG. 7 is a flowchart of a possible implementation manner of S630 shown in FIG. 6.

In some embodiments, as shown in FIG. 7, S630 includes S710 and S720.

S710, determining an initial quantization parameter of the image frame (the image frame being encoded) based on the one or more complexities of the one or more image blocks.

S720, encoding the one or more image blocks based on the initial quantization parameter.

There are many ways to determine the initial quantization parameter based on the one or more complexities of the one or more image blocks. For example, the initial quantization parameter can be calculated based on the average complexity of the one or more image blocks, or the initial quantization parameter can also be calculated based on the normalized complexity of the one or more image blocks.

For example, first, the average complexity of the one or more image blocks can be calculated based on the one or more complexities of the one or more image blocks. Then the normalized complexity of the image frame can be determined based on the average complexity of the image frame and the average pixel value of the image frame (e.g., the average complexity of the image frame may be divided by the average pixel value of the image frame to obtain the normalized complexity of the image frame). Subsequently, the initial quantization parameter can be determined based on the normalized complexity of the image frame.

When the average complexity and the average pixel value of a certain image frame is relatively low, the brightness of the image frame may be relatively low (i.e., the image frame may be relatively dark), and the complexity of the image may appear to be relatively low. However, in the actual encoding process, it may be possible to find that the bitstream required to encode this image frame is very large. The normalized complexity may be used to calculate the initial quantization parameter of the image frame, which can make the selection of the initial quantization parameter more reasonable and accurate.

There are many ways to determine the initial quantization parameter based on the complexity of the image frame (e.g., the average complexity or the normalized complexity). For example, the mapping relationship between the complexity of the image frame (e.g., the average complexity or the normalized complexity) and the quantization parameter may be established in advance based on experiments or experience. In the actual encoding process, the initial quantization parameter may be determined by looking up a table based on the complexity of the current image frame (e.g., the average complexity or the normalized complexity).

The average pixel value of the image frame may be calculated in advance. For example, when the one or more complexities of one or more image blocks is calculated, the average pixel value of the one or more image blocks can be calculated at the same time. When it is needed to calculate the normalized complexity of the one or more image blocks, the average pixel value of the image frame can be calculated based on the average pixel of the one or more image blocks. The average pixel value of the image frame may be calculated by the image signal processor or the encoding apparatus. For example, the image signal processor may calculate the average pixel value of one or more image blocks before writing the image frame to the memory. The encoding apparatus may use the average pixel value of the one or more image blocks to calculate the average pixel value of the image frame.

There are many ways to implement S720. For example, the initial quantization parameter may be used directly as the quantization parameter of all image blocks to encode the one or more image blocks. Alternatively, the initial quantization parameter may be used to encode the first image block, and then continuously adjust the quantization parameter based on the actual coding situation, thereby realizing the encoding of each image block. The method of adjusting the quantization parameter in real time will be described in detail below in conjunction with specific embodiments.

Figure 8:
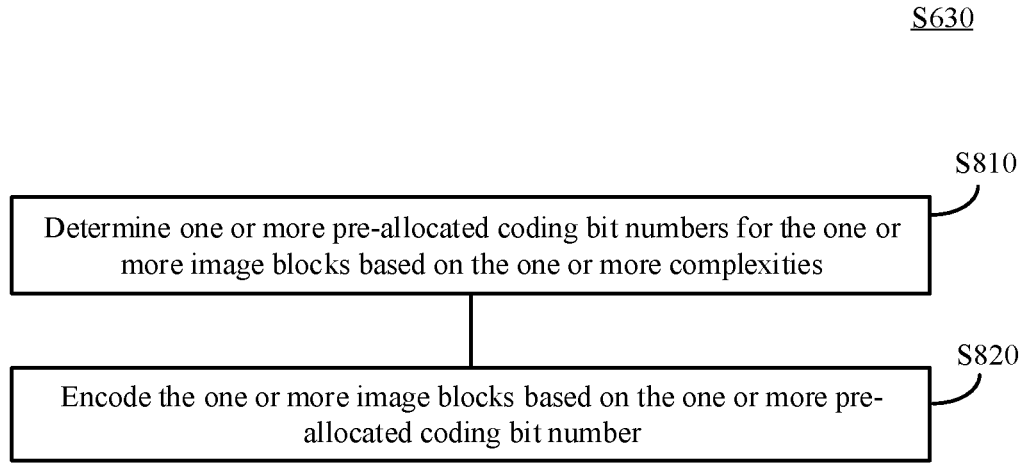
FIG. 8 is a flowchart of another possible implementation manner of S630 shown in FIG. 6.

In some embodiments, as shown in FIG. 8, S630 includes S810 and S820.

S810, determining one or more pre-allocated coding bit numbers for one or more image blocks based on the one or more complexities of the one or more image blocks. Each of the pre-allocated coding bit numbers corresponds to one of the one or more image blocks.

S820, encoding the one or more image blocks based on the one or more pre-allocated coding bit numbers of the one or more image blocks.

The pre-allocated coding bit number of an image block may refer to the coding bit number allocated to the image block in advance, which can be considered as a predicted value or an estimated value of the number of condign bits actually needed to encode the image block.

There are many ways to determine the one or more pre-allocated coding bit numbers of one or more image blocks based on the one or more complexities of the one or more image blocks as described in S810.

For example, the total complexity of the image frame may be determined based on the one or more complexities of the one or more image blocks. Then one or more quotas for the one or more image blocks may be determined based on the one or more complexities of the one or more image blocks and the total complexity of the image frame. Each of the one or more quotas corresponds to one of the one or more image blocks. Subsequently, the one or more pre-allocated bit numbers for the one or more image blocks may be determined based on the one or more quotas of the one or more image blocks and a target coding bit number of the image frame.

The image block quota can be used to indicate the ratio of the complexity of the image block to the total complexity of the image frame. The method of determining the quota for an image block may include calculating the proportion of the complexity of the image block to the total complexity. Subsequently, the quota of the image block may be determined based on the proportion of the complexity of the image block to the total complexity, such that the larger the proportion of the image block, the higher the allocated quota may be. For example, assume that the complexity of a certain image block is twice the complexity of another image block, the quota allocated to the image block may be twice the quota of the other image block.

There are many ways to determine the one or more pre-allocated coding bit numbers for one or more image blocks based on the one or more quotas of the one or more image blocks and the target coding bit number of the image frame. For example, the number of bits occupied by each quota may be calculated by using the target coding bit number and the quota of the corresponding image block (e.g., the target coding bit number may be divided by the quota of the corresponding image blocks to obtain the number of bits occupied by that quota). Subsequently, the pre-allocated coding bit number for each image block may be determined based on the quota of the image bock and the number of bits occupied by the quota (e.g., the quota of the image block may be multiplied by the coding bit number occupied by the quota to obtain the pre-allocated coding bit number for the image block).

Below are the possible implementation of S820.

If there is no target image block around the current image block, or the information of the target image block is missing, etc., the quantization parameter of the current image block may be set as the initial quantization parameter of the image frame. Alternatively, if there is a target image block around the current image block, the quantization parameter of the current image block may be determined based on the pre-allocated coding bit number of the target image block, the actual coding bit number, and the quantization parameter.

The target image block may be one or more encoded image blocks adjacent to the current image block. For example, the target image block may include the left image block and/or the upper image block of the current image block. Of course, it is also possible to select an encoded image block that is not adjacent to the current image block as the target image block.

Take the target image block including the left image block and the upper image block of the current image block as an example, the quantization parameter of the current image block may be calculated based on the pre-allocated coding bit number of the target image block, the actual coding bit number, and the quantization parameter of the left image block and the upper image block.

For example, the actual coding bit number of the current image block may be predicted first based on the actual coding bit number of the left image block and the actual coding bit number of the upper image block. In some embodiments, a linear prediction may be used to predict the actual coding bit number of the current image block. For example, the average value of the actual coding bit number of the upper image block and the actual coding bit number of the left image block may be used as the actual coding bit number of the current image block. Of course, a non-linear prediction may also be used to predict the actual coding bit number of the current image block. The specific prediction model can be determined in advance based on experience or experiment.

Then the quantization parameter of the current image block may be predicted based on the quantization parameter of the left image block and the quantization parameter of the upper image block. In some embodiments, a linear prediction may be used to predict the real quantization parameter of the current image block. For example, the average value of the quantization parameter of the left image block and the quantization parameter of the upper image block may be used as the quantization parameter of the current image block. Of course, a non-linear prediction may also be used to predict the quantization parameter of the current image block. The specific prediction model can be determined in advance based on experience or experiment.

Subsequently, the quantization parameter of the current image block may be calculated based on the predicted value of the quantization parameter of the current image block, the predicted value of the actual coding bit number, and the pre-allocated coding bit number of the current image block. For example, the product of the predicted value of the quantization parameter of the current image block and the predicted value of the actual coding bit number divided by the pre-allocated coding bit number of the current image block may be rounded and used as the quantization parameter of the current image block.

If the current image block only include the encoded left image block or the encoded upper image block, the pre-allocated coding bit number, the actual coding bit number, and the quantization parameter of the left image block and the upper image block can be regarded as equal. Subsequently, the method described above may be used to calculate the quantization parameter of the current image block. Alternatively, the quantization parameter of the current image block may also be directly set as the initial quantization parameter.

The embodiments of the present disclosure can dynamically adjust the quantization parameter of the current image block based on the encoding result of the encoded image block around the current image block, such that the selection of the quantization parameter of the image block can be more accurate.

In some embodiments, in addition to calculating the initial quantization parameter of the image frame, a maximum quantization parameter and/or a minimal quantization parameter of the image frame may also be calculated. In the actual coding process, the quantization parameter of the image block can be controlled not to exceed the maximum quantization parameter, and/or not below the minimal quantization parameter. As such, the selection of the quantization parameter of the image block can be better controlled, thereby making the encoding method more robust.

It should be noted that the embodiments of the present disclosure do not specifically limit the adjustment time of the maximum quantization parameter and/or the minimal quantization parameter. For example, the maximum quantization parameter and/or the minimal quantization parameter may be adjusted every time an image block is encoded. In another example, the maximum quantization parameter and/or the minimal quantization parameter may be adjusted once after encoding a predetermined number of image blocks continuously. In yet another example, whether the maximum quantization parameter and/or the minimal quantization parameter need to be adjusted may be determined based on the actual coding situation, such as the relationship between the actual coded bits of the coded image block and the number of pre-allocated coded bits. For example, when the difference between the actual coded bits of the coded image block and the pre-allocated coded bits is greater than a predetermined threshold, the maximum quantization parameter and/or the minimal quantization parameter may be adjusted.

In some embodiments, the maximum quantization parameter and/or the minimal quantization parameter of the image frame may be determined based on the initial quantization parameter. For example, on the basis of the initial quantization parameter, a fixed value may be added to obtain the maximum quantization parameter; or, on the basis of the initial quantization parameter, a fixed value may be reduced to obtain the minimum quantization parameter. In another example, on the basis of the initial quantization parameter, the maximum quantization parameter and/or the minimal quantization parameter may be determined by using a look-up table. The table can record the mapping relationship between the initial quantization parameter, the maximum quantization parameter, and/or the minimal quantization parameter. The mapping relationship can be obtained through simulation, or can be established based on experience.

In some embodiments, it is also possible to introduce an adjustment mechanism or the maximum quantization parameter and/or the minimal quantization parameter. Therefore, in these embodiments, the above encoding method may also include adjusting the maximum quantization parameter and/or the minimal quantization parameter based on the pre-allocated encoding parameters and the actual encoding parameters of the encoded image block.

For example, if during the coding process, the number of bits accumulated after encoding a plurality of image bocks is less than the pre-allocated coding bit number allocated to the encoded image block, the minimal quantization parameter used for encoding the image frame may be reduced.

In another example, if during the coding process, the number of bits accumulated after continuously encoding a plurality of image bocks is greater than the pre-allocated coding bit number allocated to the encoded image block, and the quantization parameter of these encoded image blocks are all equal to the maximum quantization parameter, then the maximum quantization parameter used to encode the image frame may be increased.

In the above coding process, an anti-overflow mechanism may be introduced to prevent the actual coding bit number of the image frame from exceeding the target coding bit number. The following describes several possible anti-overflow mechanisms in detail in conjunction with specific embodiments.

In some embodiments, the encoding method described above may further include determining the high-frequency quantization coefficients that need to be cutoff in the current image block based on the coding bit number of the previous image block or several previous image blocks of the current image block. A previous image block refers to an image block preceding the current image block, e.g., an image block that was processed before the current image block.

For example, when the coding bit number of the previous image block or several previous image blocks of the current image block is greater than a predetermined number of bits, the quantization coefficients greater than a predetermined threshold in the current image block may be cutoff (i.e., these quantization coefficients may be treated as zero).

In some embodiments, the encoding method described above may further include adjusting the quantization parameter of the un-encoded image block based on the coding bit number of the encoded image block and the number of pre-allocated boding bits of the encoded image block.

For example, when the difference between the coding bit number of the encoded image block and the pre-allocated coding bit number of the encoded image block is greater than the predetermined threshold, the quantization parameter of the un-encoded block may be increased.

It should be noted that the adjustment mechanism of the quantization coefficients of the un-encoded image block may be used from the beginning of the coding process, or the adjustment mechanism of the quantization coefficients of the un-encoded image block may be used under certain conditions. For example, when the number of un-encoded image block is less than or equal to a predetermined number, the quantization coefficients of the un-encoded image block may be adjusted based on the number of un-encoded image blocks, the coding bit number of the encoded image block, and the pre-allocated coding bit number of the encoded image block.

The overall framework of the image processing system is described above with reference to FIG. 4. With the development of technology, the bit depth and resolution of the image (such as RAW images) collected by the image sensor 42 are getting higher and higher, resulting in larger and larger image sizes. If the image is directly written into the memory 46, the bandwidth overhead of the system will be relatively large. At the same resolution, if the smallest bit depth can be used to write to the memory 46 while preserving almost the same amount of information, the bandwidth overhead may be reduced to a certain extent. In some embodiments, the high bit depth image can be first logged and then written into the memory 46. Log transformation can convert image data from linear data to non-linear data. The log transformation is equivalent to retaining the dynamic range of the dark area and compressing the dynamic range of the bright area. After log transformation, the image data input from the memory 46 to the encoding apparatus 48 is no longer linear image data. For some encoding apparatuses that need input image data to be linear data, the foregoing implement method may cause such encoding apparatuses to fail.

Figure 9:
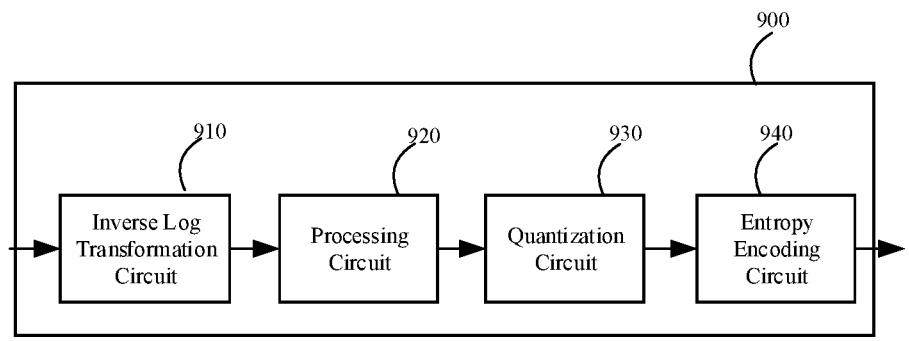
FIG. 9 is a schematic structural diagram of the encoding apparatus according to an embodiment of the present disclosure.

In view of the above, an embodiment of the present disclosure provides an encoding apparatus. As shown in FIG. 9, an encoding apparatus 900 includes an inverse log transformation circuit 910, a processing circuit 920, a quantization circuit 930, and an entropy encoding circuit 940.

The inverse log transformation circuit 910 can be used to obtain the non-linear data of the image after log transformation, and perform inverse log change on the non-linear data of the image to obtain linear data of the image.

The processing circuit 920 can be used to generate the transform coefficients of the image based on the linear data of the image.

The quantization circuit 930 can be used to quantize the transform coefficients to generate quantized coefficients of the image.

The entropy encoding circuit 940 can be used to perform entropy encoding on the quantized coefficients.

The encoding apparatus provided by the embodiments of the present disclosure includes an inverse log transformation circuit. The inverse log transformation circuit can convert the image data from non-linear data to linear data before processing the image data. As such, the encoding apparatus (the encoding apparatus the needs the input image data to be linear data) can work normally.

In some embodiments, the processing circuit 920 may include a transformation circuit. The transformation circuit can be used to transform the linear data of the image to obtain the transform coefficients of the image.

In some embodiments, the processing circuit 920 may include a pseudo-log transformation circuit and a transformation circuit. The pseudo-log transformation circuit can be used to generate non-linear data of the image based on the linear data of the image. The transformation circuit can be used to transform the non-linear data of the image to obtain the transform coefficients of the image.

In some embodiments, the encoding apparatus 900 may further include a dividing circuit and/or a bitstream output circuit. The dividing circuit can be used to divide the image to be encoded to obtain image blocks (such as slices) that can be independently encoded. The bitstream output circuit can be used to package the encoded data output by the entropy encoding circuit to obtain a bitstream, and write the bitstream into the memory of the system through the system data bus.

As described above, the encoding apparatus 900 may further include a dividing circuit, which can be used to divide the image to be encoded to obtain image blocks (such as slices) that can be independently encoded.

The embodiments of the present disclosure do not specifically limit the position of the inverse log transformation circuit 910 in the encoding apparatus 900. For example, the inverse log transformation circuit 910 may be positioned in the same circuit module as the diving circuit, or it may be positioned before the dividing circuit.

An embodiment of the present disclosure further provides an image processing system as shown in FIG. 4.

The image signal processor 42 in the image processing system 40 can be used to perform log transformation on the collected image to obtain non-linear data of the image.

For example, the processing pipeline (if the format of the image to be processed is RAW, the pipeline may be referred to as a RAW pipeline) in the image signal processor 42 can first perform noise removal operations on the image. In addition, the image signal processor 42 may include a log transformation circuit for non-linearly mapping a high bit depth image into a lower bit depth range.

The memory 46 can store non-linear data of the image. The encoding apparatus 900 can be used to encode the non-linear data of the image stored in the memory.

The circuits of the video encoder described above can be functional circuits. Different functional circuits may be implemented by the same of different hardware circuits, which is not limited in the embodiments of the present disclosure.

The transform coefficients mentioned in the present disclosure refers to the transformed coefficients, that is, the coefficients obtain after the transformation operation. In addition, the quantized coefficients mentioned in the present disclosure refers to the quantized coefficients, that is, the coefficients obtained after the quantization operation.

It should be noted that, in the case of no conflict, various embodiments and/or the technical features in the embodiments described in the present disclosure may be combined with each other arbitrarily, and the combined technical solutions shall also fall within the scope of the disclosure.

All or some embodiments of the present disclosure may be implemented in software, hardware, firmware, or combinations thereof. When being implemented in software, all or some embodiments of the present disclosure may be implemented in form of a computer program product. The computer program product includes one or more computer instructions. When being loaded and executed by a computer, the computer program instructions perform all or some steps or functions according to the flowcharts in the embodiments of the present disclosure. The computer may be a general-purpose computer, a special-purpose computer, a computer network, or other programmable devices. The computer program instructions may be stored in a computer-readable storage medium or transferred from one computer-readable storage medium to anther computer-readable storage medium. For example, the computer program instructions may be transferred from one website, one computer, one server, or one data center to another web site, another computer, another server, or another data center through wired (e.g., coaxial cable, optical fiber, digital subscriber line) or wireless (e.g., infrared, wireless, microwave, etc.) communication. The computer-readable storage medium may be any suitable medium accessible by a computer or a data storage device including one or more suitable media, such as a server or a data center. The suitable medium may be a magnetic medium (e.g., a floppy disk, a hard disk, a magnetic tape), an optical medium (e.g., a DVD disk), or a semiconductor medium (e.g., an SSD drive).

Those of ordinary skill in the art will appreciate that the example elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

The foregoing descriptions are merely some implementation manners of the present disclosure, but the scope of the present disclosure is not limited thereto. Without departing from the spirit and principles of the present disclosure, any modifications, equivalent substitutions, and improvements, etc. shall fall within the scope of the present disclosure. Thus, the scope of invention should be determined by the appended claims.

What is claimed is:

1. An encoding method comprising:
   obtaining an image frame to be encoded, the image frame including one or more image blocks;
   determining one or more complexities of the one or more image blocks, each of the one or more complexities corresponding to one of the one or more image blocks;
   determining an average complexity of the image frame based on the one or more complexities of the one or more image blocks and an average pixel value of the image frame;
   obtaining a normalized complexity of the image frame by dividing the average complexity of the image frame by the average pixel value of the image frame; and
   encoding the one or more image blocks based on at least one of the one or more complexities of the one or more image blocks, the average complexity of the image frame, or the normalized complexity of the image frame.

2. The method of claim 1, wherein encoding the one or more image blocks based on the one or more complexities includes:
   determining an initial quantization parameter for encoding the image frame based on the one or more complexities; and
   encoding the one or more image blocks based on the initial quantization parameter.

3. The method of claim 2, wherein determining the initial quantization parameter based on the one or more complexities includes:
   determining the initial quantization parameter based on the average complexity of the image frame.

4. The method of claim 3, wherein determining the initial quantization parameter based on the average complexity of the image frame includes:
   determining the initial quantization parameter based on the normalized complexity of the image frame.

5. The method of claim 2, wherein encoding the one or more image blocks based on the initial quantization parameter includes:
   in response to none of neighboring image blocks, which are neighboring to a current image block, having been encoded, setting a quantization parameter of the current image block as the initial quantization parameter of the image frame.

6. The method of claim 2, further comprising:
   determining a maximum quantization parameter and a minimal quantization parameter for encoding the image frame based on the initial quantization parameter;
   wherein encoding the one or more image blocks based on the initial quantization parameter includes encoding the one or more image blocks based on the initial quantization parameter, the maximum quantization parameter, and the minimal quantization parameter of the image frame such that a quantization parameter of each of the one or more image blocks is not larger than the maximum quantization parameter and not smaller than the minimum quantization parameter.

7. The method of claim 6, further comprising:
   adjusting at least one of the maximum quantization parameter or the minimal quantization parameter based on a pre-configured encoding parameter and an actual coding parameter of an encoded image block.

8. The method of claim 1, wherein encoding the one or more image blocks based on the one or more complexities includes:
   determining one or more pre-allocated coding bit numbers of the one or more image blocks based on the one or more complexities, each of the one or more pre-allocated coding bit numbers corresponding to one of the one or more of the image blocks; and
   encoding the one or more image blocks based on the one or more pre-allocated coding bit numbers.

9. The method of claim 8, wherein encoding the one or more image blocks based on the one or more pre-allocated coding bit numbers includes:
   in response to one or more neighboring image blocks, which are neighboring to a current image block, having been encoded, determining a quantization parameter of the current image block based on the pre-allocated coding bit number, an actual coding bit number, and a quantization parameter of each of the one or more neighboring image blocks, the one or more neighboring image blocks including at least one of a left image block or an upper image block of the current image block.

10. The method of claim 8, wherein determining the one or more pre-allocated coding bit numbers of the one or more image blocks based on the one or more complexities includes:
    determining a total complexity of the image frame based on the one or more complexities;
    determining one or more quotas of the one or more image blocks based on the one or more complexities and the total complexity, each of the one or more quotas corresponding to one of the one or more image blocks and indicating a ratio of the complexity of the corresponding image block to the total complexity of the image frame; and
    determining the one or more pre-allocated coding bit numbers based on the one or more quotas and a target coding bit number of the image frame.

11. The method of claim 1, further comprising:
    adjusting a quantization parameter of an un-encoded image block based on a coding bit number of an encoded image block and a pre-allocated coding bit number of the encoded image block.

12. The method of claim 1, wherein determining the one or more complexities includes, for one image block of the one or more image blocks:
    for each component of various components of the image frame, determining a component complexity of the one image block in the component based on a pixel value of the one image block in the component; and
    determining the complexity of the one image block based on the component complexities of the various components.

13. The method of claim 1, further comprising:
    determining a high-frequency coefficient to cutoff in a current image block based on a coding bit number of each of one or more image blocks preceding the current image block.

14. An encoding apparatus comprising:
    a processor; and
    a memory storing program instructions that, when executed by the processor, cause the processor to:
       obtain an image frame to be encoded, the image frame including one or more image blocks;
       determine one or more complexities of the one or more image blocks, each of the one or more complexities corresponding to one of the one or more image blocks;
       determine an average complexity of the image frame based on the one or more complexities of the one or more image blocks and an average pixel value of the image frame;
       obtain a normalized complexity of the image frame by dividing the average complexity of the image frame by the average pixel value of the image frame; and
       encode the one or more image blocks based on at least one of the one or more complexities of the one or more image blocks, the average complexity of the image frame, or the normalized complexity of the image frame.

15. The encoding apparatus of claim 14, wherein the program instructions further cause the processor to:
    determine an initial quantization parameter for encoding the image frame based on the one or more complexities; and
    encode the one or more image blocks based on the initial quantization parameter.

16. The encoding apparatus of claim 15, wherein the program instructions further cause the processor to:
    determine the initial quantization parameter based on the average complexity of the image frame.

17. The encoding apparatus of claim 15, wherein the program instructions further cause the processor to:
    determine a maximum quantization parameter and a minimal quantization parameter for encoding the image frame based on the initial quantization parameter; and
    encode the one or more image blocks based on the initial quantization parameter, the maximum quantization parameter, and the minimal quantization parameter of the image frame such that a quantization parameter of each of the one or more image blocks is not larger than the maximum quantization parameter and not smaller than the minimum quantization parameter.

18. The encoding apparatus of claim 14, wherein the program instructions further cause the processor to:
    determine one or more pre-allocated coding bit numbers of the one or more image blocks based on the one or more complexities, each of the one or more pre-allocated coding bit numbers corresponding to one of the one or more of the image blocks; and
    encode the one or more image blocks based on the one or more pre-allocated coding bit numbers.

19. The encoding apparatus of claim 18, wherein the program instructions further cause the processor to:
    determine a total complexity of the image frame based on the one or more complexities;
    determine one or more quotas of the one or more image blocks based on the one or more complexities and the total complexity, each of the one or more quotas corresponding to one of the one or more image blocks and indicating a ratio of the complexity of the corresponding image block to the total complexity of the image frame; and
    determine the one or more pre-allocated coding bit numbers based on the one or more quotas and a target coding bit number of the image frame.

20. The encoding apparatus of claim 14, wherein the program instructions further cause the processor to, for one image block of the one or more image blocks:
    for each component of various components of the image frame, determine a component complexity of the one image block in the component based on a pixel value of the one image block in the component; and determine the complexity of the one image block based on the component complexities of the various components.

* * * * *